United States Patent [19]

Bewley et al.

[11] Patent Number: 5,008,123
[45] Date of Patent: Apr. 16, 1991

[54] FOOD PROCESSING METHOD

[75] Inventors: David R. Bewley, Middlesex, Great Britain; Christopher J. B. Brimelow, New Milford, Conn.; Kenneth W. Wright, Twyford, Great Britain

[73] Assignee: Nestec S.A., Vevey, Switzerland

[21] Appl. No.: 532,371

[22] Filed: Jun. 4, 1990

[30] Foreign Application Priority Data

Jun. 15, 1989 [GB] United Kingdom ............... 8913738

[51] Int. Cl.$^5$ ............................................. A23L 1/00
[52] U.S. Cl. .................................... 426/509; 99/470; 426/523; 426/524
[58] Field of Search ............... 426/523, 509, 510, 511, 426/524; 99/470, 406, 407, 416

[56] References Cited

U.S. PATENT DOCUMENTS

| | | | |
|---|---|---|---|
| 4,134,998 | 1/1979 | Liebermann | 426/509 |
| 4,278,697 | 7/1981 | Liebermann | 426/509 |
| 4,407,316 | 10/1983 | Ihringer | 134/107 |

Primary Examiner—George Yeung
Attorney, Agent, or Firm—Vogt & O'Donnell

[57] ABSTRACT

Meat is processed by introducing it into a mobile cooking vessel after which the vessel is sealed from the atmosphere. A stock liquor is heated by a heat exchanger to a cooking temperature of at least 60° C. and circulated through the vessel and the heat exchanger for a time sufficient to heat and cook the meat. After the meat is cooked, the circulating stock liquor is cooled by the heat exchanger to a temperature suitable to cool the heated, cooked meat to a temperature of no more than 15° C. within 45 minutes.

13 Claims, 1 Drawing Sheet

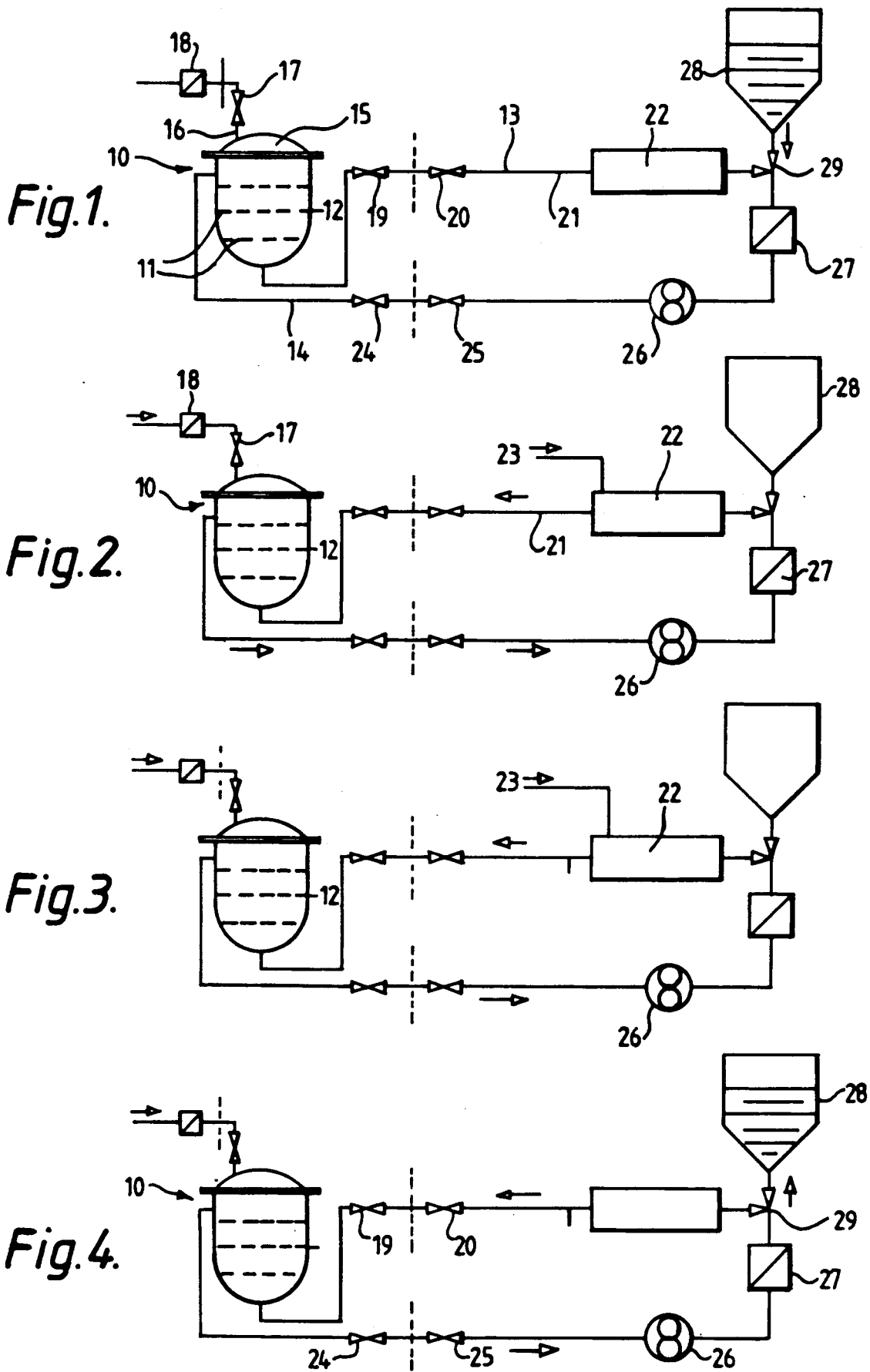

FOOD PROCESSING METHOD

The present invention relates to a method of processing food, and more particularly to a method of processing meat during the preparation of a chilled food product.

BACKGROUND OF THE INVENTION

The consumer market is constantly changing. Consumers are becoming more discerning and have a greater awareness of dietary needs. In particular, consumers are increasingly showing a preference for natural foods not containing any "artificial" ingredients such as preservatives, stabilisers or artificial colouring or flavouring. Fresh food is, therefore, becoming more popular than dried, processed or frozen foods.

Chilled foods are perceived as being fresh and natural, the chilled cabinet is one of the fastest growing sectors of the European food market. However, a major problem of chilled culinary foods at the present time is that, unless they contain added preservatives, the maximum shelf life is usually no more than about seven days.

When one considers that, after manufacture, the life or a chilled food usually comprises distribution to a retailer, backof-store chill storage, display in chill cabinets, purchase by the consumer, transport home and storage in the refrigerator before consumption, a shelf life of seven days is extremely short and it would be desirable to have a significantly longer shelf life of up to three weeks or more yet without the addition of any "artificial" ingredients.

SUMMARY OF THE INVENTION

We have found that these objects may be achieved by linking together special cooking and pasteurization techniques, and cooling techniques with hygienic filling, packing and sealing methods. The filling, packing, and sealing can be carried out in an air-conditioned room, known as a "clean-room", similar to the type used in the pharmaceutical industry for manufacturing such products as enteric feeds.

In the case of chilled foods containing meat as a constituent, it is important for microbiological safety reasons and for sensory quality reasons, that cooling of the meat is carried out as rapidly as possible after cooking. One way to do this is to carry out the two processes in the same vessel. The cooked and cooled meat then has to be transported to the filling line in a microbiologically clean fashion.

We have found that both these requirements can be achieved by a processing method which involves the use of a special mobile, recirculation process vessel.

Accordingly, the present invention provides a method of processing meat characterized in that the meat is introduced into a mobile cooking vessel, the vessel is sealed and adjusted to superatmospheric pressure using an air/steam mixture or an inert gas, a stock liquor is passed through a heat exchanger to raise its temperature to at least 60° C. and circulated through the vessel and heat exchanger for a period of time sufficient to heat up, cook and pasteurise the meat, substantially immediately after which the circulating stock liquor is cooled by the same heat exchanger to a temperature suitable for cooling the meat to 15° C. or below within a maximum time of 45 minutes.

DETAILED DESCRIPTION OF THE INVENTION

Any animal meat may be processed by the method of the present invention, for example, beef, pork, lamb, mutton, veal, poultry or game. The method is particularly valuable for chicken, diced beef or pork fillets.

By a mobile cooking vessel we mean any cooking vessel capable of being transported either by hand or mechanically in a closed state while containing the cooked and cooled meat. For example, the vessel may be provided with wheels.

Before being introduced into the vessel, the meat is prepared into pieces of a size appropriate for the final product and the surface and shape of the meat pieces are set, conveniently by surface frying, for instance, at 120° C.-200° C. for a short time (40 to 120 seconds) or by grilling, blanching in hot water or heating in hot air.

After the meat has been introduced into the vessel, the vessel may be sealed by conventional means and pressurised to a pressure conveniently from 0 to 4 atmospheres and preferably from ½ to 1 atmospheres. The atmosphere used may be air, steam or a mixture of steam and air, but if desired, other food acceptable gases may be used, for example, nitrogen, carbon dioxide, helium or nitrous oxide or convenient mixtures of these gases. The use of oxygen-free gases, especially nitrogen, improves the flavour of the cooked meat and helps to reduce any warmed-over flavour which may occur after prolonged storage of the final chilled product. Warmed-over flavour is characteristically often found with cooked, stored and re-heated meats.

The stock liquor may be any conventional stock solution or cooking medium in which the particular meat product could be cooked.

The heat exchanger used in the method of the invention is preferably a plate heat exchanger. When the heat exchanger is used to raise the temperature of the stock liquor, it is conveniently heated by hot water or steam, under pressure if necessary. When the heat exchanger is used to cool the stock liquor, it is conveniently cooled by chilled water or a cryogenic liquid, for instance, liquid $NH_3$, liquid $CO_2$, liquid $SO_2$, or possibly directly evaporated Freon.

The stock liquor, which is conveniently stored in a stock tank, is advantageously pumped through the heat exchanger, for instance, by a standard centrifugal pump, or, alternatively, a piston pump may be used to circulate it through the vessel. Preferably, the stock is pumped upwards from the bottom of the vessel, and removed from the side at a point near the top, though it may be sprayed from the top of the vessel and removed from the base, to heat up and then cook the meat by flowing around the meat pieces.

The heating up to the cooking temperature, which is taken as the centre temperature of the meat pieces, usually takes from about 15 to 45 minutes, preferably from 20 to 30 minutes. The cooking is conveniently carried out for a period of from 5 to b 60 minutes depending upon the type of meat and the size of the meat pieces. The cooking temperature depends on the type of meat used, but is usually from about 60° C. to 110° C.

If desired, provision may be made for circulating other marinades through the vessel in addition to the stock solution. If desired, provision can be made for supplying a suitable food grade gas to the headspace of the vessel during the heating and cooking sequence.

Immediately after the cooking step, the heating fluid in the heat exchanger is replaced by a coolant, so that the circulating stock liquor is cooled sufficiently to cool the meat to below 15° C. and preferably below 10° C. within 45 minutes. During cooling, a sterile gas is used to pressurise the vessel. For example, this may be done by passing it through a presterilised air filter.

When the meat has cooled to the required temperature, the stock liquor is pumped out of the vessel, conveniently back to the stock tank and the vessel is disconnected from its back-up plant and transported to a packing room via a surface cleaning system, for example, an alcohol spray, to sterilise the surface. Preferably, the vessel remains under pressure after it has been disconnected from its back-up plant. This may be achieved by means of stop valves which form part of the vessel and are closed before any disconnection thus maintaining pressure within the vessel. Means may also be provided for topping-up the pressure within the vessel after disconnection in case of a leak. The vessel may also be provided with automatic pressure relief before the lid can be opened.

In the filling room, the vessel is opened, the meat is removed and filled into packages, if desired, together with other pasteurized ingredients or garnishes, after which the packages are hermetically sealed and chilled rapidly, for instance, by blast chilling, usually to a temperature less than 4° C. over a maximum period of 90 minutes.

Such chilled products containing meat processed by the method of the present invention may have a shelf life of three weeks or more.

The present invention also provides a mobile cooking vessel which comprises means for sealing, pressurizing, and then circulating a stock liquor through the vessel and a heat exchanger.

The vessel of the present invention is preferably of a size which enables a food product to be introduced and removed by hand and may be provided with one or more removable mesh grids on which the food product may be placed. A plurality of mesh grids serve as separators which enable the meat pieces to be arranged in layers and thus prevent the meat layers from compacting and hence ensuring an even temperature distribution within the vessel. Preferably the vessel is of a size which allows it to be transported by hand and may conveniently be provided with wheels.

If desired, in addition to the means for circulating the stock liquor, the vessel may be provided with means for circulating other marinades in order to obtain desired flavour characteristics.

The vessel may also be provided with means of pressurising it with air or other gases.

The present invention is further illustrated by way of example with reference to the accompanying drawings.

BRIEF DESCRIPTION OF THE DRAWINGS

FIG. 1 represents the loading stage,
FIG. 2 represents the heating stage,
FIG. 3 represents the cooling stage and
FIG. 4 represents the draining stage.

DETAILED DESCRIPTION OF THE DRAWINGS

Referring to the drawings, the system comprises a mobile process vessel 10 provided with removable mesh grids 11, a temperature probe 12, feed pipes 13,14, and a lid 15 provided with a feed pipe 16 having a valve 17 and sterile air filter 18. Feed pipe 13 is provided with valves 19,20, a thermostat 21 and a heat exchanger 22 fitted with an inlet pipe 23 for steam or cooling water as desired (the outlet pipe is not shown), while feed pipe 14 is provided with valves 24,25, a pump 26 and a filter 27. A reservoir 28 is connected via a valve 29 to the heat exchanger 28 and the filter 27.

In operation, referring to FIG. 1, the mobile process vessel 10 is sterilised using water at 125° C. and then manually loaded with chicken pieces which have previously been passed through a fryer to surface fry in shallow cooking fat at 125° C. The chicken pieces are loaded in layers on the mesh grids 11. The temperature probe 12 is inserted into the centre of one of the pieces of chicken. Stock solution from the reservoir 28 is poured into the open vessel 10 until the chicken pieces are covered. The lid 15 of the vessel 10 is then shut and clamped down.

Referring now to FIG. 2, stock is then pumped by pump 26 from the vessel 10 through the filter 27 and then the heat exchanger 22 and back to the vessel 10. Steam is introduced through inlet pipe 23 into the heat exchanger thus heating up the stock until it has reached the control temperature recorded by the thermostat 21. The stock circulates raising the temperature of the chicken pieces and when the temperature probe 12 reaches the predetermined cooking temperature of 90° C after about 25 minutes, the cooking starts. In the meantime, steam is passed through the air filter 18 in order to sterilise it. The cooking time is 15 minutes.

Referring to FIG. 3 after the cooking has finished the steam supply through the air filter 18 is shut off and compressed air is passed through the filter 18 and valve 17 to the vessel to pressurise it to about 0.5 atmosphere. In addition, the steam supply through pipe 23 is turned off from the heat exchanger 22 and replaced by a supply of chilled water at 2° C which cools the stock to 5° C. and hence the chicken pieces to 10° C. in 45 minutes. Once the temperature probe 12 reaches the pre-determined cooling point the pump shuts down.

Referring to FIG. 4, the stock is then pumped back into the reservoir 28 and the valves 19,20,24,25 and 29 are closed. The vessel 10 is then uncoupled and wheeled through an alcohol spray unit to sterilise its exterior surfaces and into the packing room.

In the packing room the vessel is opened and the cooked chicken pieces are placed in a plastic tray, and other components added before the tray is hermetically sealed and chilled to 3° C. in 60 minutes by means of a blast chiller.

We claim:

1. A method for processing meat comprising introducing meat into a mobile cooking vessel, sealing the meat-containing vessel from the atmosphere, heating a stock liquor with a heat exchanger to a cooking temperature of at least 60° C. and circulating the heated stock liquor through the vessel and the heat exchanger for a period of time sufficient to heat the meat to a cooking temperature and to cook the meat, and after cooking the meat, cooling the circulating stock liquor with the heat exchanger to a temperature suitable to cool the cooked meat to a temperature of no more than 15° C. within 45 minutes.

2. A method according to claim 1 further comprising pumping cooled stock liquor out of the vessel after the meat has cooled to no more than 15° C, transporting the vessel to a sterilizing unit and sterilizing the surface of the vessel, of the vessel, transporting the sterilized vessel to a packing room, opening the vessel, removing the meat and then packing the meat in packages.

3. A method according to claim 1 or 2 further comprising, after sealing the vessel, pressurizing the meat-containing vessel to a pressure of up to 4 atmospheres.

4. A method according to claim 3 wherein the vessel is pressurized with a gas selected from the group of gases consisting of air, steam, a mixture of steam and air, nitrogen, carbon dioxide, helium oxide and nitrous oxide.

5. A method according to claim 1 or 2 further comprising pressurizing the vessel with a sterile gas while cooling the cooked meat.

6. A method according to claim 1 or 2 wherein the stock liquor is heated to from 60° C. to 110° C.

7. A method according to claim 1 or 2 wherein the meat first is heated for from 15 minutes to 45 minutes to raise the temperature of the meat to the cooking temperature and then the heated meat is cooked for from 5 minutes to 60 minutes.

8. A method according to claim 1 or 2 wherein the cooked meat is cooled to a temperature of less than 10°0 C.

9. A method according to claim 1 or 2 further comprising surface frying the to be processed and then introducing the surface fried meat into the vessel.

10. A method according to claim 1 wherein the stock liquor is circulated into and through the vessel by being pumped upwards from the bottom of the vessel.

11. A method according to claim 1 further comprising circulating marinades through the vessel.

12. A method according to claim 1 wherein the heat exchanger is a plate heat exchanger.

13. A method according to claim 2 wherein the vessel is maintained under pressure while being transported.

* * * * *

UNITED STATES PATENT AND TRADEMARK OFFICE
CERTIFICATE OF CORRECTION

PATENT NO. : 5,008,123

DATED : April 16, 1991

INVENTOR(S) : David R. BEWLEY, et al.

It is certified that error appears in the above-identified patent and that said Letters Patent is hereby corrected as shown below:

Column 2, line 21, "pressurised" should be --pressurized--.

Column 4, line 68 (line 5 of claim 2), after the comma after the first occurrence of "vessel", delete "of the vessel".

Column 6, lines 4-5 (lines 2-3 of claim 8), "10°0C" should be --10°C--.

Column 6, line 7 (line 2 of claim 9), after "the", insert --meat--.

Signed and Sealed this

Fifteenth Day of September, 1992

*Attest:*

DOUGLAS B. COMER

*Attesting Officer*     *Acting Commissioner of Patents and Trademarks*